United States Patent
Miyasaka

[15] 3,663,878
[45] May 16, 1972

[54] DIRECT CURRENT MOTOR COMMUTATION SYSTEM RESPONSIVE TO C.E.M.F.

[72] Inventor: Takao Miyasaka, Yokohama, Japan

[73] Assignee: Victor Company of Japan, Ltd., Kanagawa-ku, Yokohama, Kanagawa-ken, Japan

[22] Filed: Aug. 26, 1970

[21] Appl. No.: 66,911

[30] Foreign Application Priority Data

Aug. 28, 1969 Japan.................................44/67577

[52] U.S. Cl..............................318/254, 318/331, 318/327
[51] Int. Cl. ...........................................................H02k 29/00
[58] Field of Search...................318/439, 138, 254, 696, 695, 318/345, 331

[56] References Cited

UNITED STATES PATENTS

| | | |
|---|---|---|
| 3,304,481 | 2/1967 | Saussele..................................318/138 |
| 3,475,668 | 10/1969 | Mieslinger..............................318/138 |
| 3,329,852 | 7/1967 | Saussele et al..........................318/138 |
| 3,274,471 | 9/1966 | Moczala.............................318/254 X |

Primary Examiner—G. R. Simmons
Attorney—Holman & Stern

[57] ABSTRACT

A commutatorless type direct current (DC) motor which has a rotor made of permanent magnet. Stator windings are sequentially passed with a current of constant phase rotation and thereby the rotor is initiated to rotate. After starting, counter electromotive forces induced in the stator windings are used for detecting the rotation angle of the rotor. Adequate currents are thereby made to flow in the stator windings and a steady rotation of the rotor is continuously performed.

7 Claims, 30 Drawing Figures

Patented May 16, 1972

INVENTOR
Takao Miyasaka

BY Holman & Stern
ATTORNEYS

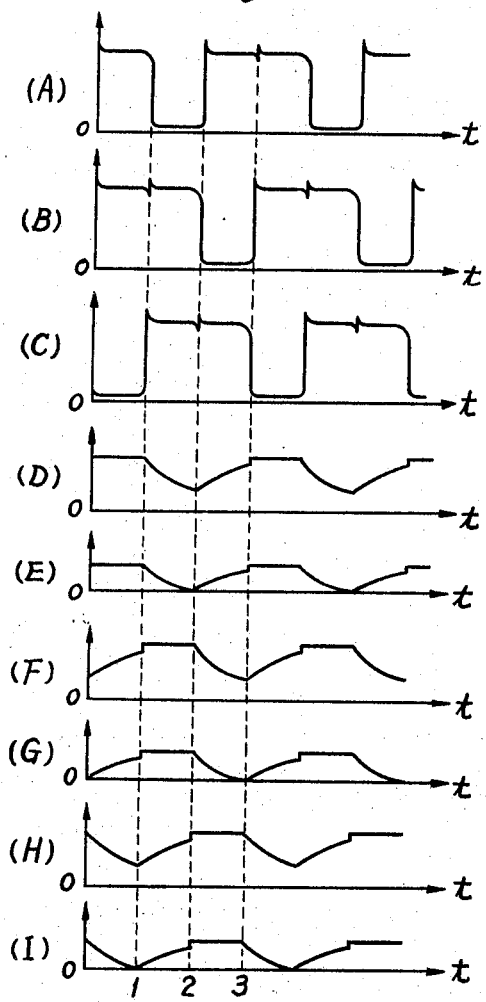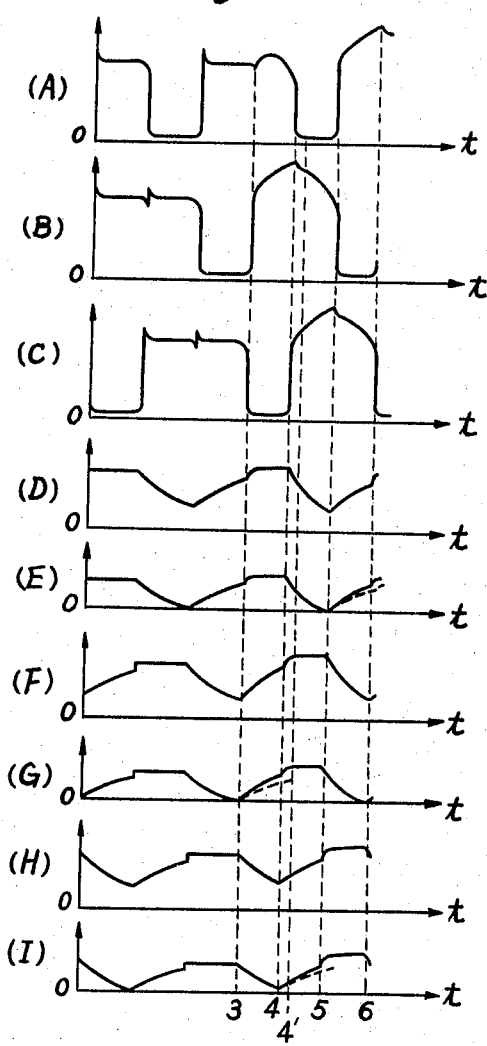

DIRECT CURRENT MOTOR COMMUTATION SYSTEM RESPONSIVE TO C.E.M.F.

This invention relates to a direct current (DC) motor, and more particularly to a commutatorless type DC motor which is capable of self-starting without reading a particular means for detecting the rotor position.

Conventionally, in a self-starting type commutatorless motor, a means has hitherto been required for detecting a position of the rotor when the motor is started. Thereby, a complicated drive circuit and high manufacturing cost have resulted in the case of the for the conventional motor.

Therefore, the present invention has a general object to provide a DC motor which has eliminated such disadvantages of the conventional motor and which has novelty and great utility.

Another object of the invention is to provide a commutatorless type DC motor which is capable of self-starting by means of a very simple circuit construction.

A further object of the invention is to provide a transistorized commutatorless motor which permits self-starting without the necessity of means for detecting a position of the rotor upon self-starting of the motor.

A still further object of the invention is to provide a DC motor having a construction adapted to start a permanent magnet rotor by passing current of a constant phase rotation sequentially to stator coils with a particular pattern of polyphase oscillation. In the DC motor after being started, the rotation angle of a rotor is detected by use of a counter electromotive force induced in a stator coil and thereby the steady rotation of the rotor is continued.

These and other objects and features of the invention will be apparent from the following description set forth with reference to the accompanying drawings, in which.

Figure 3:
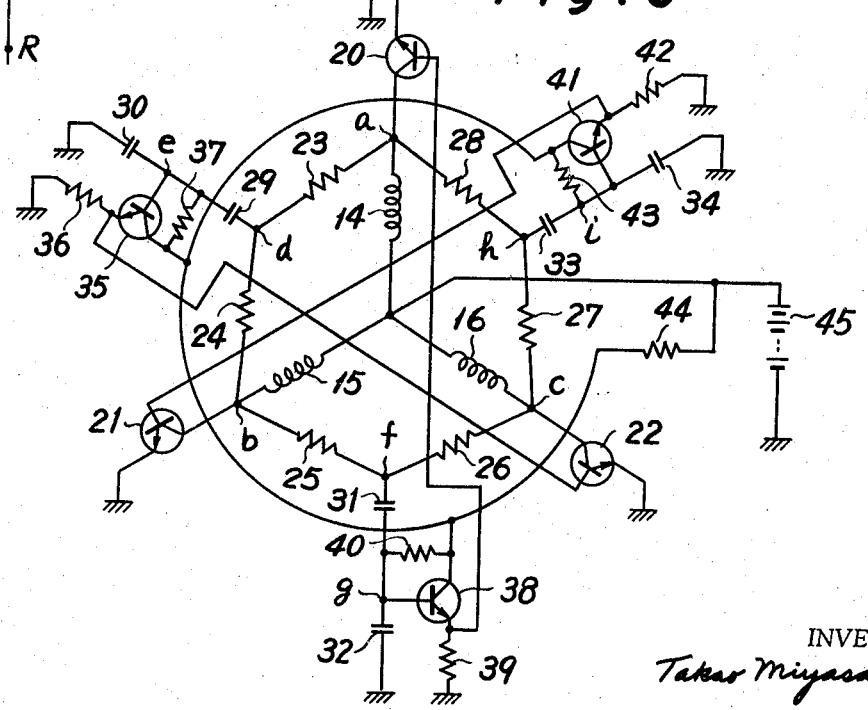
FIG. 3 is a circuit diagram showing a circuit of the motor as shown in FIG. 1.

FIGS. 4(A) to 4(I) are respectively waveforms of voltages at each part of the circuit as shown in FIG. 3 at the starting time of the motor;

FIGS. 5(A) to 5(I) are respectively waveforms of voltages at each part of the circuit as shown in FIG. 3 during a transient period from motor starting to steady rotation; and FIGS. 6(A) to 6(I) are respectively waveforms of voltages of each part of the circuit as shown in FIG. 3 during steady rotation of the motor.

Figure 1:
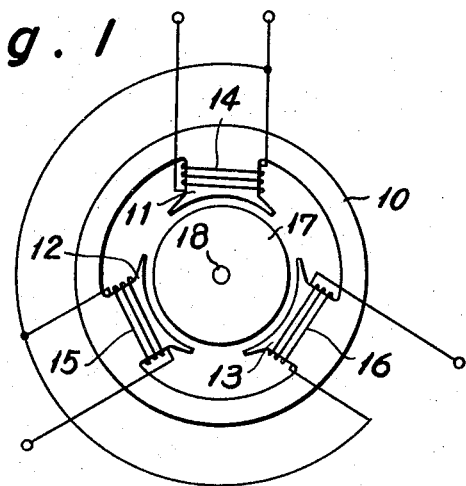
FIG. 1 is a diagrammatic view illustrating the construction of an embodiment of a DC motor according to the present invention.

Referring to FIG. 1, the construction of an embodiment of a DC (direct current) motor according to the invention is diagrammatically illustrated. A stator iron core 10 has integrally three salient poles 11, 12 and 13 at equal intervals. The salient poles 11, 12 and 13 have respectively stator coils 14, 15 and 16 wound thereon. The stator coils 14, 15 and 16 have their ends connected in common to a three-phase star connection as later described. A rotor 17 is provided in the stator 10 to rotate with a rotary shaft 18. The rotor 17 consists of a permanent magnet magnetized to form two opposite poles in a diametral direction of the rotor. Where the permanent magnet of the rotor 17 is magnetized to form four poles, the salient poles of the stator iron core 10 are required to be six in the number.

Figure 2:
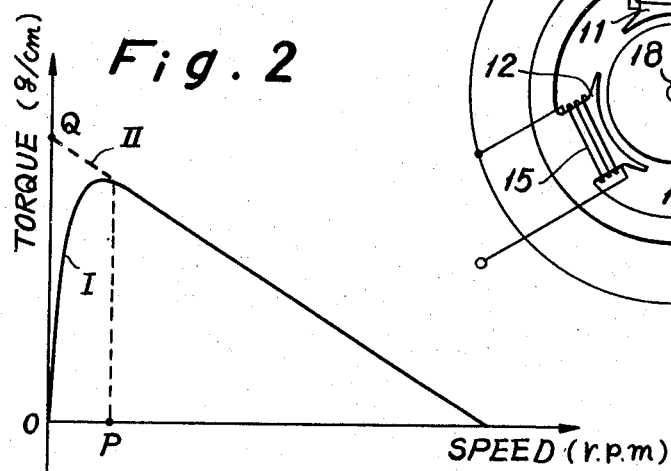
FIG. 2 is a diagram showing a characteristic of rotation speed relative to torque of the DC motor.

Characteristics of the rotation speed relative to torque of the motor are shown in FIG. 2. In the figure, a curve I designates the torque characteristic of the DC motor of the invention. A straight line II denotes the torque characteristic of an ordinary DC motor. As will be apparent from the straight line II, an ordinary DC motor is characterized in that as the rotation speed decreases the torque increases nearly linearly up to a zero point of speed. In contrast to this, the DC motor of the invention is characterized in that as the rotation speed is reduced lower than a point P the torque is steeply decreased. Therefore, the starting torque, at the still state of the motor, becomes apparently zero.

From FIG. 2, it will be seen that the DC motor of the invention does not start under load from a still state. However, actually, there alternately appear the torques as shown respectively at a point Q and point R upon starting of the motor. Therefore, if the magnitude of load inertia is less than a certain limit, the motor can be started.

Figure 6:
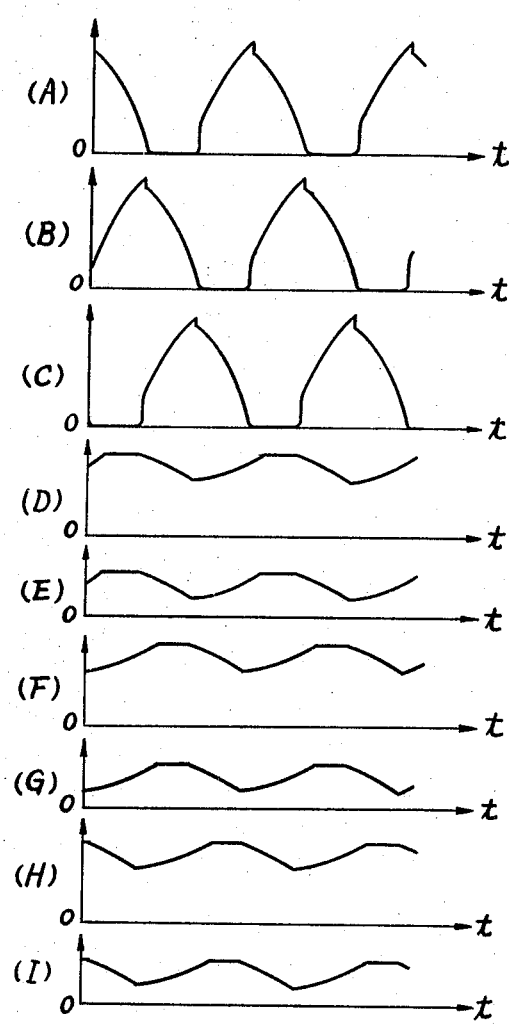

Operation of the DC motor according to the invention will now be illustrated with reference to the circuit as shown in FIG. 3 and the waveforms as shown in n FIG. 4 through FIG. 6. 6.

As seen in FIG. 3, the coils 14, 15 and 16 are connected at a common point. The common point or neutral point of a three-phase star connection is connected to the positive terminal of a power source 45. The free ends of the coils 14, 15 and 16 are respectively connected through points $a$, $b$ and $c$ to collectors of transistors 20, 21 and 22. The transistors 20, 21 and 22 have emitters which are respectively connected to the negative side of the power source 45, i.e., they are earthed. Resistors 23 and 24 are connected in series between the points $a$ and $b$. Resistors 25 and 26 are connected between the points $b$ and $c$. Resistors 27 and 28 are connected between the points $c$ and $a$. There are provided in series capacitors 29 and 30 between a connection point $d$ of the resistors 23 and 24 and the ground, capacitors 31 and 32 between a connection point $f$ of the resistors 25 and 26 and the ground, and capacitors 33 and 34 between a connection point $h$ of the resistors 27 and 28 and the ground in series connection respectively.

A transistor 35 has a base connected to a connection point $e$ of the capacitors 29 and 30, an emitter earthed through a resistor 36, and a collector connected through a resistor 37 to the point $e$ and the capacitor 29. In the similar way, a transistor 38 has a base connected to a connection point $g$ of the capacitors 31 and 32, an emitter earthed through a resistor 39, and a collector connected through a resistor 40 to the point $g$ and the capacitor 31. A transistor 41 has a base connected to a connection point $i$ of the capacitors 33 and 34, an emitter earther through a resistor 42, and a collector connected through a resistor 43 to the point $i$ and the capacitor 33.

The collectors of the transistors 35, 38 and 41 are respectively connected in common and further connected through a resistor 44 to the positive terminal of the power source 45. And the base of the transistor 20 is connected to the emitter of the transistor 38. The base of the transistor 21 is connected to the emitter of the transistor 41. The base of the transistor 22 is connected to the emitter of the transistor 35.

In the circuit of the construction as above described, each circuit element may be determined to have a value as below. Expressing the inductance values of the coils 14, 15 and 16 as $L_1$, $L_2$ and $L_3$ respectively, the following formula is obtained $L_1 \approx L_2 \approx L_3$. This formula results normally from the construction of the main body of the DC motor. Eventhough an exact equality is not provided, the motor will rotate. But vibrations of rotation are increased, and therefore, the equality may desirably be provided. Each of the transistors 20, 21 and 22 is a transistor of the same rating. Each of the transistors 35, 38 and 41 is a transistor of the same rating. Here, the resistance values of the resistors 23, 24, 25, 26, 27 and 28 are expressed respectively by $R_1$, $R_2$, $R_3$, $R_4$, $R_5$ and $R_6$, then $R_1 \approx R_3 R_5$ and $R_2 \approx R_4 \approx R_6$. The capacitance values of the capacitors 29, 30, 31, 32, 33 and 34 are expressed respectively by $C_1$, $C_2$, $C_3$, $C_4$, $C_5$ and $C_6$, then $C_1 \approx C_3 \approx C_5$ and $C_2 \approx C_4 \approx C_6$. It is assumed that the resistance values $R_1$, $R_3$ and $R_5$ are respectively one third of $R_2$, $R_4$ and $R_6$ and the capacitance values $C_1$, $C_3$ and $C_5$ are respectively about 3 to 15 times as large as the values of $C_2$, $C_4$ and $C_6$. These ratios may preferably be determined adequately in response to the actuation points of the transistor. Where the resistance values $R_1$, $R_3$ and $R_5$ are substituted for the values of $R_2$, $R_4$ and $R_6$, the direction of phase rotation is reversed and thereby the rotation of the motor is reversed. The resistors 36, 37, 39, 40, 42, 43 and 44 are resistors for imparting biases on respective transistors 35, 38 and 41 so as to determine their actuation points. These resistance values may be preferably determined corresponding to the transistor in actual use and the output of the motor.

Operation of the circuit of the above construction will be described below. The operation of the rotor 17 upon starting of rotation is at first explained. FIGS. 4(A) to 4(I) show waveforms of voltages relative to ground at the points $a$ to $i$ respectively at the instant of starting. Now, the transistors 20 and 21 are in non-conductive state and the transistor 22 is in conductive state. During the time $t$ passing from 0 to 1, as shown in FIGS. 4(A) and 4(B), the electric potentials of the points $a$ and $b$ are both positive and the potential of the point $c$ is nearly at zero. In this condition, a voltage is applied through resistors 23 and 24 to the point $d$ from the points $a$ and $b$ as shown in FIG. 4(D). The voltage at the point $d$ is a fixed positive voltage. The voltage at the point $e$ is a voltage of a value at point d reduced by a constant value as shown in FIG. 4(E). The transistor 35 is supplied with the voltage of point $e$ at its base and is in a conductive state. Then, the transistor 22 is supplied at its base by the emitter voltage of the transistor 35 to hold its conductive state. Under this circumstance, a current flows through only the coil 16.

Since the voltage at the point $c$ is zero, the voltage at the point $f$ is a voltage which is obtained by dividing the voltage at the point $b$ (nearly the same as power source voltage) with the resistance values $R_1$ and $R_2$. Actually, as the capacitors 31 and 32 are connected to the point $f$, the voltage at the point $f$ gradually rises, as shown in FIG. 4(F), to the above described divided voltage while the capacitors 31 and 32 are charged (namely during the time $t$ from 0 to 1). At this instant, as shown in FIG. 4(G), the voltage at the point $g$ is equal in magnitude to the amount of voltage at point $f$ reduced by a constant amount The voltage of point $g$ rises with the lapse of time and reaches a predetermined value when the time $t$ becomes 1. Then, the transistor 38 is supplied with the voltage of point $g$ at its base and reaches a conductive state. However, during the period of time passing from 0 to 1, the transistor 38 is a non-conductive state. Therefore, the transistor 20 is not in conductive state. Then, no current flows through the coil 14.

During the time before the time $t$ becomes 0, the series connected capacitors 33 and 34 have been already charged with a certain voltage. Since the voltage of the point $c$ is nearly equivalent to a zero voltage and the voltage of the point $a$ is close to the power source voltage, the capacitors 33 and 34 are discharged until the voltage of the point $h$ becomes to be a voltage equal to the voltage of the point $a$ divided by resistors 27 and 28. Thus, the voltage of the point $h$ is gradually reduced during the time passing from 0 to 1 as shown in FIG. 4(H). At this instant, the transistor 41 remains to be in non-conductive state and also the transistor 21 in non-conductive state. Then, no current flows through the coil 15. The voltage of the point $i$ also lowers as shown in FIG. 4(I).

When the time $t$ has reached 1 as described above, the transistor 38 is in a conductive state. Thereby the emitter voltage of the transistor 38 is applied to the base of the transistor 20 and thereby the transistor 20 reaches a conductive state. Then a current flows through the coil 14.

By conductance of the transistor 20, the voltage of the point $a$ is approximately at zero in the period of time $t$ passing from 1 to 2 as shown in FIG. 4(A). As the voltage of point $a$ is nearly at zero, the electric charges stored in the capacitors 29 and 30 are discharged. By discharging of the capacitors, the voltage of the point $d$ lowers to a voltage equal to the voltage of the point $b$ divided by the resistors 23 and 24. This causes the voltage of the point $e$ to lower. When the voltage of point $e$ starts to drop, the transistor 35 instantly reaches a non-conductive state. Accordingly, the transistor 22 reaches a non-conductive state and the voltage of point $c$ rises nearly up to the power source voltage. Therefore, the current which has been flowing through the coil 16 until the time $t$ passes to 1 does not flow after the time $t$ be 1.

The transistor 21 remains then to be in a non-conductive state and a current is not still flowing in the coil 15.

Similarly as described in the above, the capacitors 33 and 34 are charged during the period as the time $t$ passes from 1 to 2. The voltage of the point $h$ rises to the voltage of the point $c$ divided by the resistors 27 and 28. When the time $t$ reaches at 2 and the charging has been completed, with the voltage of the point $i$ rising completely, the transistor 41 reaches a conductive state. Thus the transistor 21 becomes also to be in conductive state. After the time $t$ reaches 2, a current flows through the coil 15.

After reaching the time reaches 2, the capacitors 31 and 32 are discharged and instantly the transistor 38 reaches a non-conductive state. The transistor 20 then is in non-conductive state and a current does not flow through the coil 14. Also, a current has not flowed through the coil 16.

In the similar way as above described, the transistors repeat their conductive and non-conductive states, with current flowing through coils in sequence in the order of 16, 14, 15, 16 - - - . Accordingly, the stator coils 14, 15 and 16 are supplied with a current in a constant phase rotation.

Now, it will be apparent that, if the inertia composed of the rotor of the motor and the load applied thereon is at zero or approximately at zero, the rotor rotates in the direction of phase rotation. Even when the load has an inertia of certain magnitude, it is possible to start the motor by having the speed of phase rotation large enough to overcome the inertia. In the circuit of this invention, it is possible to select the speed of phase rotation within a relatively large range by varying the values of the resistors 23–28 and the capacitors 29–34.

One of the important points of the present circuit is that the speed of phase rotation as hereinabove described is automatically increased by the speed of the rotor in the transient period of speed from starting to normal rotation. This condition is illustrated below with reference to FIG. 5. FIGS. 5(A) to 5(I) show waveforms of voltages at the points $a$ to $i$ varying during the transient period as above described. The operation during the time $t$ passes from 0 to 3 is quite same as in the starting time as explained with reference to FIG. 4.

During the period of the time $t$ passing from 3 to 4, the voltage of the point $c$ is approximately at zero as shown in FIG. 5(C). Current flows through the coil 16 during this period. The rotor 17 rotates in the direction of the above phase rotation. Then, the magnetic flux of the rotating permanent magnet rotor 17 interlinks with the coils 14 and 15 where a counter electromotive force is generated in the coils 14 and 15. This electromotive force is added to the voltages of points $a$ and $b$ so that the voltages will become higher than the supplied power source voltage. Consequently, the voltage of the point $g$ rises as shown by solid lines in FIG. 5(G). With reference to FIG. 5(G), the broken lines show the waveforms of the voltage without this counter electromotive force being added.

When the voltage of the point $g$ reaches a predetermined value, the transistor 38 reaches a in conductive state and the transistor 20 in conductive state. It may be apparent from FIG. 5(G) that where the counter electromotive force is absent, the transistor 20 becomes to be in conductive state when the time $t$ reaches 4' relative to the voltage of the point $g$. However, as the counter electromotive force is generated in this circuit, the voltage of the point $g$ will rise more rapidly as shown by solid lines than as shown by broken lines. Thus, the transistor 20 reaches a conductive state when the time $t$ reaches 4 (before it reaches 4').

In the similar way, the timing of other transistors which are becoming conductive may be quickened by the counter electromotive force more than when the counter electromotive force is not generated. Thereby, the starting of the rotor 17 can be carried out more smoothly. Thus, when the rotor 17 is increased in speed up to a certain frequency of rotation during low speed rotation, a relatively larger counter electromotive force is generated in each coil than at the starting time or in the transient period.

Waveforms of the voltages of points $a$ to $i$ during steady rotation of the rotor 17 are shown in FIG. 6(A) to FIG. 6(I). (I). In steady rotation, one transistor out of the transistors 20, 21 and 22 always detects the position of the rotor 17 by a voltage obtained by dividing, through the resistors $R_1$ and $F_2$, resistors $R_3$ and $R_4$, and resistors $R_5$ and $R_6$, the counter electromotive force of the coil connected to other two transistors. Thus, each transistor becomes sequentially conducting and the rotation is continued. The rotation speed of the rotor 17 in this condition nearly corresponds to the rotation speed at the point P as shown in FIG. 2. With the rotation speed more rapid than at the point P, the motor of the present invention presents the same characteristics as of a DC motor having commutator.

Examples of constants of each element of the circuit shown in FIG. 3 are as follows.

| | | |
|---|---|---|
| Resistor | 23 | 10KΩ |
| | 24 | 33KΩ |
| | 25 | 10KΩ |
| | 26 | 33KΩ |
| | 27 | 10KΩ |
| | 28 | 33KΩ |
| | 36 | 68KΩ |
| | 37 | 68KΩ |
| | 39 | 68KΩ |
| | 40 | 68KΩ |
| | 42 | 68KΩ |
| | 43 | 68KΩ |
| | 44 | 39KΩ |
| Capacitor | 29 | 10μF |
| | 30 | 1μF |
| | 31 | 10μF |
| | 32 | 1μF |
| | 33 | 10μF |
| | 34 | 1μF |
| Transistor | 20 | 2SD-931 |
| | 21 | do |
| | 22 | do |
| | 35 | 2SC-828 |
| | 38 | do |
| | 41 | do |

Additionally, the motor of the present invention can be provided with a known regulator circuit for controlling the rotation frequency.

Thus, in accordance with the invention, the motor is capable of self-starting without any special means for detecting the position of the motor. The circuit of the motor is therefore very simple in construction and it can be manufactured at very low cost. The starting torque is theoritically zero so that it cannot self start when the inertia of load is extremely large. However, with a suitable speed of phase rotation chosen the maximum value of the load inertia for starting in the present invention is particularly large as compared with a conventional transistorized motor used for example in clocks. The motor of this invention is thus most adapted for phono motors of record players and motors of tape recorders.

What I claim is:

1. A direct current motor which comprises: a permanent-magnet rotor; a stator disposed concentrically of the rotor; stator windings wound on parts of the stator and having ends connected to each other at a star point in multiphase star connection; a power source having one terminal connected between the star point of the stator windings and having its other terminal connected to respective other ends of the stator windings; and control circuit means interposed between said power source and said respective other ends of the stator windings, said control circuit means including a plurality of identical control stages which are equal in number to that of said stator windings, each one of said control stages including two resistors connected between said respective other ends of two adjacent stator windings; a first transistor circuit interposed to connect one of said respective other ends of the stator windings to the other end of the power source; capacitors connected, to earth a connecting point of said resistors through the capacitors; a first transistor connected between one of said respective other ends of the stator windings and said other terminal of the power source to control flow of current through the associated stator winding, and a second transistor circuit adapted to be in conductive state or non-conductive state by time constant circuits of the resistors and the capacitors when said capacitor means are charged to more than a predetermined voltage, said second transistor circuit switching the first transistor circuit sequentially to be in conductive state or non-conductive state, and wherein counter electromotive forces are induced in said stator windings by rotation of the rotor after starting and wherein the charging time of said capacitors is quickened by the counter electromotive force.

2. The motor of claim 1 wherein the permanent magnet rotor is magnetized to form two poles in diametral directions thereof, in which said parts of the stator are three salient poles and said stator windings are respectively wound on the salient poles provided in the stator, said stator windings being connected to each other in a three phase star connection.

3. The motor of claim 1, in which said resistors are respectively two resistors connected in series which have respectively different resistance value, said resistors being respectively connected between the other ends of the stator windings, and in which said capacitors are respectively two capacitors connected in series connected between connection points of the series resistors and ground.

4. The motor of claim 1 in which said first transistor circuits include first transistors having respective emitters connected to the other ends of the power source, collectors connected to the other ends of the stator windings, and bases connected to the second transistor circuits.

5. The motor of claim 4 in which said second transistor circuits include second transistors having respective emitters connected to the bases of the first transistors and bases connected to the capacitors.

6. The motor of claim 1 in which said resistors are respectively two resistors connected in series which have respectively different resistance value, said resistors being respectively connected between the other ends of the stator windings, and said second transistor circuits include transistors having respective bases connected to connection point of the series resistors through the capacitors, said transistors actuated by voltages of the connection points.

7. The motor of claim 1 in which, during a transition period from rotation starting to normal rotation, counter electromotive forces are generated by the rotation of the permanent magnet rotor in the stator windings through which phase rotation current is not flowing, and thereby a speed of the phase rotation is increased.

* * * * *